US009600740B2

(12) United States Patent
Tang et al.

(10) Patent No.: US 9,600,740 B2
(45) Date of Patent: Mar. 21, 2017

(54) SYSTEM AND METHODS FOR SEMI-AUTOMATED EDITING OF ORTHO-MOSAICS BUILT FROM REMOTELY-SENSED IMAGERY

(71) Applicant: DigitalGlobe, Inc., Longmont, CO (US)

(72) Inventors: Matthew Tang, Conifer, CO (US); John Theil, Lafayette, CO (US); David Neckels, Berthoud, CO (US)

(73) Assignee: DigitalGlobe, Inc., Longmont, CO (US)

( * ) Notice: Subject to any disclaimer, the term of this patent is extended or adjusted under 35 U.S.C. 154(b) by 0 days.

(21) Appl. No.: 14/730,227

(22) Filed: Jun. 3, 2015

(65) Prior Publication Data

US 2015/0339530 A1 Nov. 26, 2015

Related U.S. Application Data

(63) Continuation-in-part of application No. 14/681,043, filed on Apr. 7, 2015, which is a continuation-in-part of application No. 13/942,356, filed on Jul. 15, 2013, which is a continuation of application No. 13/417,568, filed on Mar. 12, 2012, now Pat. No. 8,488,845, which is a continuation of application No. 12/606,918, filed on Oct. 27, 2009, now Pat. No. 8,155,391, which is a continuation-in-part of application No. 11/764,765, filed on Jun. 18, 2007, now Pat. No. 7,653,218, which is a continuation-in-part of application No. 11/416,276, filed on May 2, 2006, now abandoned.

(Continued)

(51) Int. Cl.
*G06K 9/00* (2006.01)
*G06K 9/48* (2006.01)
*G06T 17/05* (2011.01)
*G08G 1/123* (2006.01)
*G01C 21/36* (2006.01)

(52) U.S. Cl.
CPC ............... *G06K 9/48* (2013.01); *G06T 17/05* (2013.01); *G01C 21/3676* (2013.01)

(58) Field of Classification Search
USPC ....... 382/100, 102, 103, 106, 155, 162, 168, 382/173, 181, 189, 190, 193, 199, 209, 382/219, 232, 254, 274, 276, 285–291, 382/305, 312, 113, 206; 340/995.1; 128/922; 250/306
See application file for complete search history.

(56) References Cited

U.S. PATENT DOCUMENTS

| 6,493,465 | B2 * | 12/2002 | Mori | G06T 7/0026 |
| | | | | 382/199 |
| 6,766,043 | B2 * | 7/2004 | Zeng | G06T 7/0012 |
| | | | | 128/922 |

(Continued)

*Primary Examiner* — Seyed Azarian
(74) *Attorney, Agent, or Firm* — Galvin Patent Law LLC; Brian R. Galvin

(57) ABSTRACT

A system for automated mosaic-based vector editing comprising a mosaic imaging server that assembles image tiles to form larger image mosaics while correcting the image tiles for tonality and other visual characteristics, a vector analysis server that analyzes vector information, a routing calculation server that calculates routes from the vector information, and a rendering engine that produces visualizations from the routing information, and a method for image mosaic creation and correction.

4 Claims, 11 Drawing Sheets

Related U.S. Application Data

(60) Provisional application No. 62/007,103, filed on Jun. 3, 2014, provisional application No. 61/976,483, filed on Apr. 7, 2014.

(56) References Cited

U.S. PATENT DOCUMENTS

| | | | |
|---|---|---|---|
| 6,777,679 B2 * | 8/2004 | Nagaoki | G01N 23/04 |
| | | | 250/306 |
| 2005/0114354 A1 * | 5/2005 | Singh | G09B 29/106 |
| 2007/0096945 A1 * | 5/2007 | Rasmussen | G01C 21/32 |
| | | | 340/995.1 |

* cited by examiner

SYSTEM AND METHODS FOR SEMI-AUTOMATED EDITING OF ORTHO-MOSAICS BUILT FROM REMOTELY-SENSED IMAGERY

CROSS-REFERENCE TO RELATED APPLICATIONS

This application is a continuation-in-part of U.S. patent application Ser. No. 14/681,043, titled "ADVANCED SEMI-AUTOMATED VECTOR EDITING IN TWO AND THREE DIMENSIONS", filed on Apr. 7, 2015, and claims the benefit of, and priority to, U.S. provisional patent application Ser. No. 61/976,483, filed on Apr. 7, 2014 titled "ADVANCED VECTOR EDITING", the entire specification of which is incorporated herein by reference in its entirety, and also is a continuation-in-part of U.S. patent application Ser. No. 13/942,356, titled "SEMI-AUTOMATIC EXTRACTION OF LINEAR FEATURES FROM IMAGE DATA INCLUDING PATH WIDTH ATTRIBUTION", which was filed on Jul. 15, 2013, which is a continuation of U.S. patent application Ser. No. 13/417,568, titled "SEMI-AUTOMATIC EXTRACTION OF LINEAR FEATURES FROM IMAGE DATA", now patented as U.S. Pat. No. 8,488,845, which was filed on Mar. 12, 2012, which is a continuation of U.S. patent application Ser. No. 12/606,918, titled "SEMI-AUTOMATIC EXTRACTION OF LINEAR FEATURES FROM IMAGE DATA", now patented as U.S. Pat. No. 8,155,391, which was filed on Oct. 27, 2009, which is a continuation-in-part of U.S. patent application Ser. No. 11/764,765, titled "SEMI-AUTOMATIC EXTRACTION OF LINEAR FEATURES FROM IMAGE DATA", now patented as U.S. Pat. No. 7,653,218, which was filed on Jun. 18, 2007 which is a continuation-in-part of U.S. patent application Ser. No. 11/416,276, titled "SEMI-AUTOMATIC EXTRACTION OF LINEAR FEATURES FROM RADAR IMAGE DATA", which was filed on May 2, 2006, the entire specifications of each of which is incorporated herein in its entirety by reference. This application also claims the benefit of, and priority to, U.S. provisional patent application Ser. No. 62/007,103, titled "TECHNIQUES FOR VECTOR EDITING", filed on Jun. 3, 2014, the entire specifications of each of which are incorporated herein by reference in their entirety.

BACKGROUND OF THE INVENTION

Field of the Art

The disclosure relates to the field of image processing, and more particularly to the field of vector processing for large-scale satellite image processing systems.

Discussion of the State of the Art

In high-quality, high-resolution, RGB satellite ortho-mosaics, several properties are desired: (a) Seamlines between adjacent mosaic regions should be as inconspicuous as possible; (b) Color tone and saturation should be consistent on similar image content in neighboring mosaic regions; (c) Color tone and saturation should be consistent when transitioning from one side of a seamline to the other; (d) Image content in the mosaic should be tonally realistic, or otherwise plausible and aesthetically pleasing. An automated system to construct such a mosaic takes an initial collection of image strips, tonally adjusts them, constructs seamlines within the overlap area between neighboring image strips, and clips the strips to the seamlines. (In "High Value Geographic Areas", seamlines should ride along common thin linear channels like roads, trails, and single line drainage, as well as common boundaries like city outskirts, forest boundary, mountain crests and ravines, and farm field boundaries.) The resulting mosaic regions fit together like puzzle pieces to form the mosaic.

Since automated seamline construction does not always route seamlines in a satisfactory way, what is needed is a semi-automated ability to locally edit the seamlines of a mosaic and re-clip the incident mosaic regions accordingly.

Since automated tonal matching is generally not satisfactory everywhere, what is needed is semi-automated capability for tonal matching.

What is needed is a semi-automated capability to perform global tonal adjustment, that is, adjusting gain/bias per band of a mosaic region (image strip), as a means toward tonal matching of adjacent mosaic regions. What is additionally needed is the ability for the user to select two or more mosaic regions and perform semi-automated global tonal adjustment across the selected regions as a whole, that is, adjusting the gain/bias per band across the selected regions as a whole.

In the course of tonal matching, local area features (e.g., cities) that straddle a seamline may appear tonally mismatched across a seam-line. What is needed is a semi-automated capability to perform local uniform tonal adjustment, i.e., adjusting gain/bias per band within a local constraint region of a mosaic region (image strip).

Global tonal adjustment on its own, often does not achieve sufficiently good tonal matching along seamlines between adjacent mosaic regions. This motivates the concept of a local tonal adjustment function f(x, y) that adjusts gain/bias per band per mosaic region (or per band per group of adjacent mosaic regions), that is to be applied to each pixel (x, y). If f(x, y) is given explicit definition at the boundary of a mosaic region so as to achieve good tonal matching in the vicinity of seamlines with neighboring regions, then the value of f(x,y) within the interior of the mosaic region can be smoothly interpolated from the boundary values. What is needed is both an automated and semi-automated capability to define f(x,y) at the boundary of a mosaic region, and an automated capability to smoothly interpolate f(x, y) into the interior of the mosaic region. Additionally what is needed is a semi-automated capability to insert a local tonal adjustment point P into an existing local tonal adjustment function f(x,y). Here the location and tonal adjustment values for the point are specified manually. The function f(x,y) is automatically modified to agree with the tonal adjustment values at the point (pixel) P, while continuously transitioning in the vicinity of P to the tonal adjustment values at P. Similarly, what is needed is a semi-automated capability for the removal of P and a return to the original local tonal adjustment function f(x, y).

It is undesirable for clouds to appear in a mosaic as they obscure the landscape beneath. Other adverse areas may occur in the mosaic (cloud shadow, snow patch, glint, etc.). To "correct" such an area, what is needed is a semi-automated capability that enables the user to peruse through a stack of alternate imagery covering the area, extract a corresponding patch from one of these images, and incorporate it into the current mosaic. Additionally what is needed is the capability to tonally adjust the patch so that it fits into the mosaic as seamlessly as possible.

SUMMARY OF THE INVENTION

PARAGRAPH: A system and method to enable semi-automated editing of seamlines in an ortho-mosaic, including real-time re-clipping of image strips to the updated seamlines. Reduced to practice. Has an interactive graphical user interface.

PARAGRAPH: A system and method to enable semi-automated global tonal adjustment of the mosaic regions (image strips) in an ortho-mosaic. Reduced to practice. Has an interactive graphical user interface.

PARAGRAPH: A system and method to enable semi-automated constrained tonal adjustment for local area features (e.g., cities) that straddle a seamline. Reduced to practice. Has an interactive graphical user interface.

PARAGRAPH: A system and method to enable semi-automated construction of a local tonal adjustment function on a mosaic region so that the region tonally matches neighboring mosaic regions in the vicinity of the shared boundary. The system and method additionally enables semi-automated insertion of tonal adjustment points into an existing local tonal adjustment function. Supports deletion as well. Reduced to practice. Semi-automated version has an interactive graphical user interface.

PARAGRAPH: A system and method to enable, in semi-automated fashion, excising a patch from the current mosaic and replacing it with a patch from an external image (not participating in the initial mosaic); (b) tonally adjusting the replacement patch; (c) tonally feathering the replacement patch into the rest of the mosaic. Reduced to practice. Has an interactive graphical user interface.

PARAGRAPH: A system and method enabling the user to peruse through a stack of imagery covering a clouded area of the current ortho-mosaic, extracting a corresponding patch from one of the images in the stack, and splicing it into the current mosaic. The system additionally supports tonal adjust of the patch so that it fits into the mosaic as seamlessly as possible. Reduced to practice. Has an interactive graphical user interface.

Accordingly, the inventor has conceived and reduced to practice, in a preferred embodiment of the invention, a system and methods for semi-automated vector editing of the seamlines in an ortho-mosaic.

According to a preferred embodiment of the invention, a system for rerouting seamline vectors comprising a vector analysis server stored and operating on a network-connected computing device, a routing calculation server stored and operating on a network-connected computing device, and a rendering engine stored and operating on a network-connected computing device, is disclosed. According to the embodiment, a vector analysis server may be utilized to perform analysis operations on received vectors such as (for example) retrieving and analyzing vectors from a vector storage such as a database or other data storage means (such as, for example, integral or removable hardware-based storage such as a hard disk drive, or software-based storage schema common in the art). Additionally, an analysis server may analyze raster images such as by retrieving from a raster storage, for example such as map images or similar raster-based image data. These analyzed vectors and rasters may then be provided to a routing calculation server, that may then identify or associate a plurality of vector points or paths with a raster image, for example identifying a vector-based path and correlating it with a raster-based satellite image of a physical space, forming a combined "route" representing a vector path through the physical space.

Calculated routes may then be provided to a rendering engine, that may analyze the routes and form visualizations of the combined vector and raster data such as may be presentable on a viewer such as a display screen, for example for review by a human user. Additionally, a user may interact with the visualization presented using a variety of input devices such as (for example) a computer mouse or keyboard, such as to manipulate the visualization or modify the information being presented. User input may be received by the rendering engine and utilized to update the rendering appropriately (such as to zoom in or out, for example), or may be further provided by the rendering engine to a routing calculation server as needed, for example to recalculate a route based on user modification (such as according to any of the methods described below, referring to FIGS. 6-7). As needed, modified routes may be further provided to a vector analysis server, for example to analyze new vector points based on user input, or for storage for future reference.

According to another preferred embodiment of the invention, a plurality of software-based processing methods for execution on a system for rerouting seamline vectors, are disclosed.

According to the embodiment, a method for seamline vector editing in "single-point detour mode", is disclosed. In this mode, a circle may appear in a display (for example, such as a graphical vector routing display according to the invention) centered at the instantaneous location of the mouse cursor in an initial step. This circle may delimit a region of influence around an interaction cursor. In a next step, the cursor may move or be moved, along with the circle moving with it. In a next step, the circle may come in contact with an initial vector V, and in a next step the vector may be rerouted in real-time through the cursor location and within the confines of the circle. This allows for a visual preview of the reroute prior to committing to it. In a next step, interacting with the interface (such as pressing a key on a keyboard or clicking a computer mouse, or any other suitable means of user input) on the current cursor location accomplishes the actual commit. In an optional side step, user input may be received to manipulate the cursor or the circle, such as (for example) scrolling the wheel on a computer mouse. Upon editing (rerouting) the seamline vector V, whether during preview or commit, the image strips (rasters) in the mosaic that were clipped against the original seamline vector V are re-clipped in real-time against the rerouted seamline vector V and re-displayed in the viewer.

According to the embodiment, a method for seamline vector editing in "multi-point detour mode", is disclosed. In this mode, in an initial step, the user may place a mouse-click at location $P_1$ in the vicinity of a seamline vector V in the viewer. In subsequent steps, the user may place additional mouse clicks at locations $P_2$, $P_3$, . . . , $P_{k-1}$ in the viewer, and in a final step, the user indicates the last location in the sequence, $P_k$, with a double mouse click, again in the vicinity of V. In an initial step, upon clicking at location $P_1$, the shortest line segment from V to $P_1$ may be constructed and displayed in the viewer. In a final step, upon double-clicking at location $P_k$, the shortest line segment from $P_k$ to V may be constructed and displayed in the viewer. In a middle step, after clicking at location $P_{j+1}$, a straight line segment from $P_j$ to $P_{j+1}$ may be displayed in the viewer. While the mouse-cursor location $P_{j+1}$ is in motion, the straight line segment from $P_j$ to $P_{j+1}$ may also be displayed in the viewer. When the double-click finally occurs at location $P_k$, the polygonal path through $P_1$, $P_2$, $P_3$, . . . , $P_k$ replaces the corresponding section of the original seamline vector V. Additionally, the image strips (rasters) in the mosaic that were clipped against the original seamline vector V are re-clipped in real-time against the rerouted seamline vector V and re-displayed in the viewer.

Seth describe in a paragraph the behavior of the "Move Junction" editing operation. End that paragraph with: Additionally, the image strips (rasters) in the mosaic that were clipped by seamline vectors incident to the junction (seamlines that are now rerouted by the "Move Junction" editing operation) are re-clipped in real-time against the rerouted seamline vectors and re-displayed in the viewer.

BRIEF DESCRIPTION OF THE DRAWING FIGURES

The accompanying drawings illustrate several embodiments of the invention and, together with the description, serve to explain the principles of the invention according to the embodiments. It will be appreciated by one skilled in the art that the particular embodiments illustrated in the drawings are merely exemplary, and are not to be considered as limiting of the scope of the invention or the claims herein in any way.

DETAILED DESCRIPTION

Figure 1:
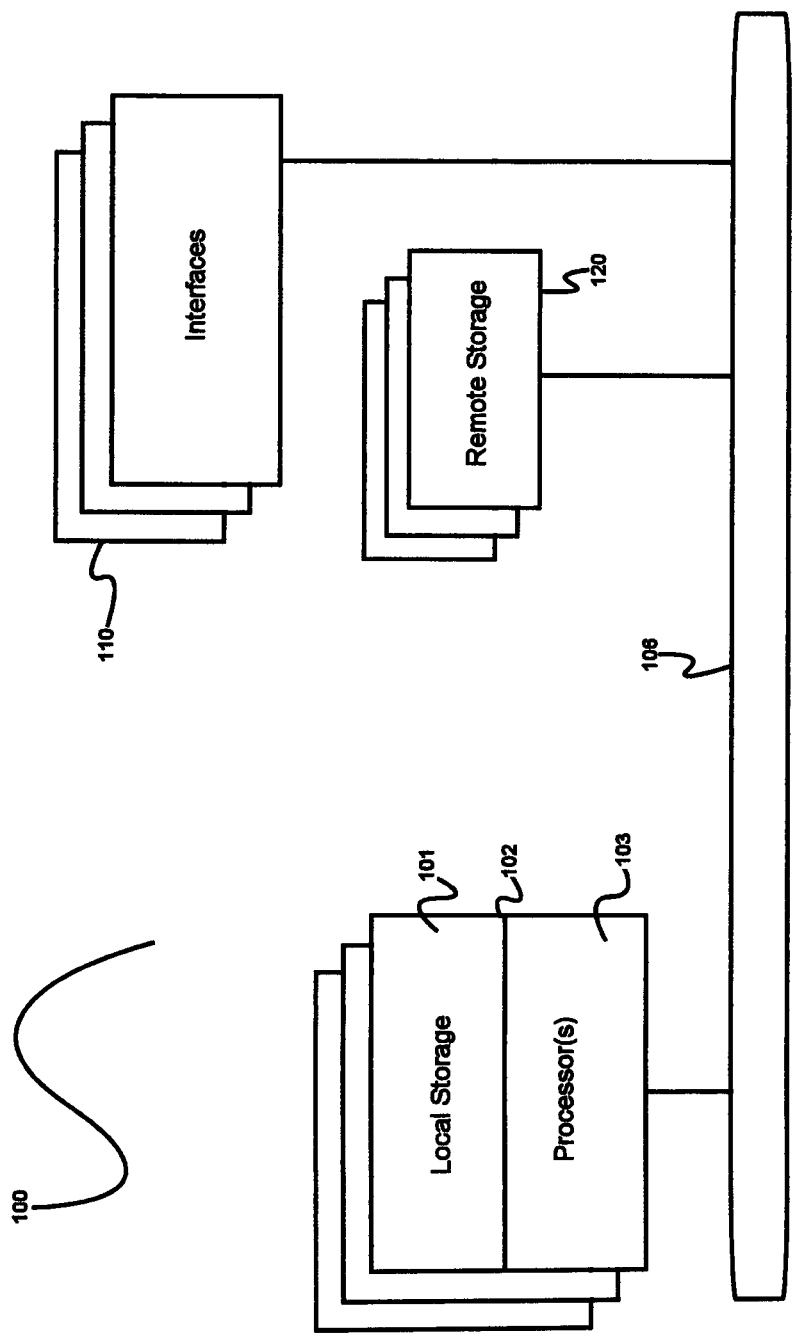
FIG. 1 is a block diagram illustrating an exemplary hardware architecture of a computing device used in an embodiment of the invention.

The inventor has conceived and reduced to practice, in a preferred embodiment of the invention, a system and methods for semi-automated vector editing of seamlines in an ortho-mosaic.

One or more different inventions may be described in the present application. Further, for one or more of the inventions described herein, numerous alternative embodiments may be described; it should be appreciated that these are presented for illustrative purposes only and are not limiting of the inventions contained herein or the claims presented herein in any way. One or more of the inventions may be widely applicable to numerous embodiments, as may be readily apparent from the disclosure. In general, embodiments are described in sufficient detail to enable those skilled in the art to practice one or more of the inventions, and it should be appreciated that other embodiments may be utilized and that structural, logical, software, electrical and other changes may be made without departing from the scope of the particular inventions. Accordingly, one skilled in the art will recognize that one or more of the inventions may be practiced with various modifications and alterations. Particular features of one or more of the inventions described herein may be described with reference to one or more particular embodiments or figures that form a part of the present disclosure, and in which are shown, by way of illustration, specific embodiments of one or more of the inventions. It should be appreciated, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Referring now to FIG. 1, there is shown a block diagram depicting an exemplary computing device 100 suitable for implementing at least a portion of the features or functionalities disclosed herein. Computing device 100 may be, for example, any one of the computing machines listed in the previous paragraph, or indeed any other electronic device capable of executing software- or hardware-based instructions according to one or more programs stored in memory. Computing device 100 may be adapted to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 100 includes one or more central processing units (CPU) 102, one or more interfaces 110, and one or more busses 106 (such as a peripheral component interconnect (PCI) bus). When acting under the control of appropriate software or firmware, CPU 102 may be responsible for implementing specific functions associated with the functions of a specifically configured computing device or machine. For example, in at least one embodiment, a computing device 100 may be configured or designed to function as a server system utilizing CPU 102, local memory 101 and/or remote memory 120, and interface(s) 110. In at least one embodiment, CPU 102 may be caused to perform one or more of the different types of functions and/or operations under the control of software modules or components, which for example, may include an operating system and any appropriate applications software, drivers, and the like.

CPU 102 may include one or more processors 103 such as, for example, a processor from one of the Intel, ARM, Qualcomm, and AMD families of microprocessors. In some embodiments, processors 103 may include specially designed hardware such as application-specific integrated circuits (ASICs), electrically erasable programmable read-only memories (EEPROMs), field-programmable gate arrays (FPGAs), and so forth, for controlling operations of computing device 100. In a specific embodiment, a local memory 101 (such as non-volatile random access memory (RAM) and/or read-only memory (ROM), including for example one or more levels of cached memory) may also form part of CPU 102. However, there are many different ways in which memory may be coupled to system 100. Memory 101 may be used for a variety of purposes such as, for example, caching and/or storing data, programming instructions, and the like. It should be further appreciated that CPU 102 may be one of a variety of system-on-a-chip (SOC) type hardware that may include additional hardware such as memory or graphics processing chips, such as a Qualcomm SNAPDRAGON™ or Samsung EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 110 are provided as network interface cards (NICs). Generally, NICs control the sending and receiving of data packets over a computer network; other types of interfaces 110 may for example support other peripherals used with computing device 100. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 110 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 1 illustrates one specific architecture for a computing device 100 for implementing one or more of the inventions described herein, it is by no means the only device architecture on which at least a portion of the features and techniques described herein may be implemented. For example, architectures having one or any number of processors 103 may be used, and such processors 103 may be present in a single device or distributed among any number of devices. In one embodiment, a single processor 103 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 120 and local memory 101) configured to store data, program instructions for the general-purpose network operations, or other information relating to the functionality of the embodiments described herein (or any combinations of the above). Program instructions may control execution of or comprise an operating system and/or one or more applications, for example. Memory 120 or memories 101, 120 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a Java™ compiler and may be executed using a Java virtual machine or equivalent, or files containing higher level code that may be executed by the computer using an interpreter (for example, scripts written in Python, Perl, Ruby, Groovy, or any other scripting language).

Figure 2:
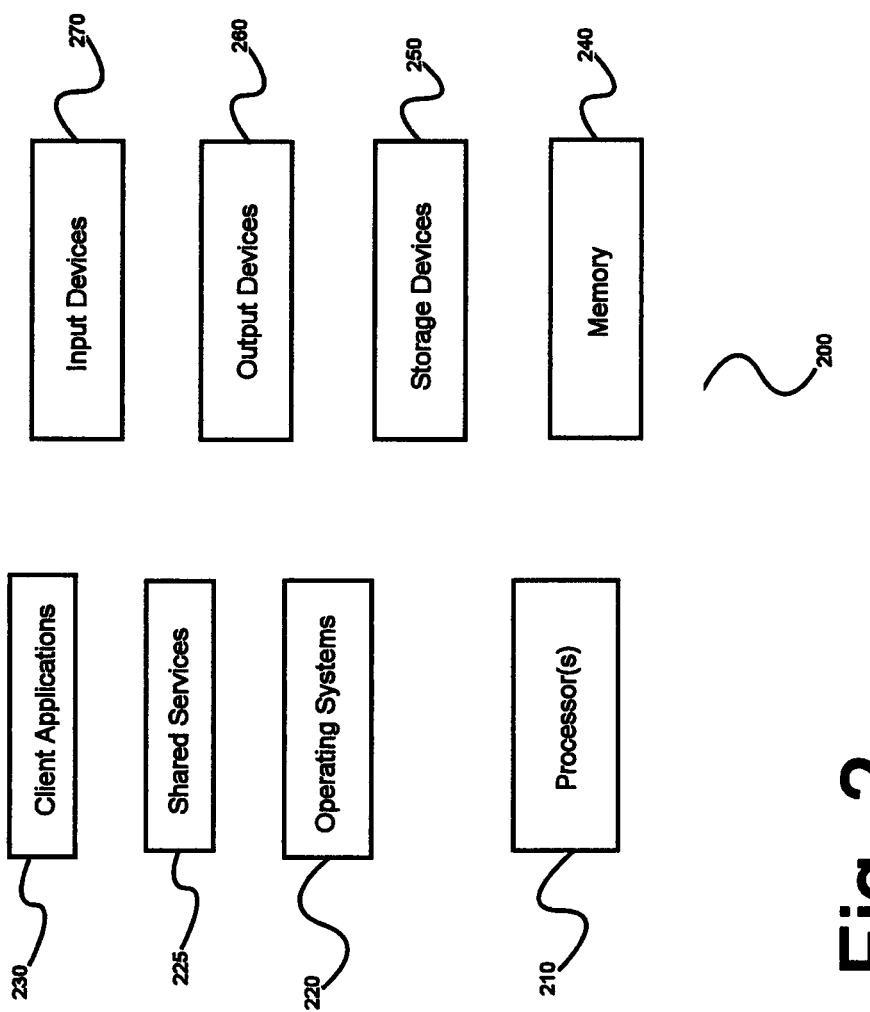
FIG. 2 is a block diagram illustrating an exemplary logical architecture for a client device, according to an embodiment of the invention.

In some embodiments, systems according to the present invention may be implemented on a standalone computing system. Referring now to FIG. 2, there is shown a block diagram depicting a typical exemplary architecture of one or more embodiments or components thereof on a standalone computing system. Computing device 200 includes processors 210 that may run software that carry out one or more functions or applications of embodiments of the invention, such as for example a client application 230. Processors 210 may carry out computing instructions under control of an operating system 220 such as, for example, a version of Microsoft's WINDOWS™ operating system, Apple's Mac OS/X or iOS operating systems, some variety of the Linux operating system, Google's ANDROID™ operating system, or the like. In many cases, one or more shared services 225 may be operable in system 200, and may be useful for providing common services to client applications 230. Services 225 may for example be WINDOWS™ services, user-space common services in a Linux environment, or any other type of common service architecture used with operating system 210. Input devices 270 may be of any type suitable for receiving user input, including for example a keyboard, touchscreen, microphone (for example, for voice input), mouse, touchpad, trackball, or any combination thereof. Output devices 260 may be of any type suitable for providing output to one or more users, whether remote or local to system 200, and may include for example one or more screens for visual output, speakers, printers, or any combination thereof. Memory 240 may be random-access memory having any structure and architecture known in the art, for use by processors 210, for example to run software. Storage devices 250 may be any magnetic, optical, mechanical, memristor, or electrical storage device for storage of data in digital form (such as those described above, referring to FIG. 1). Examples of storage devices 250 include flash memory, magnetic hard drive, CD-ROM, and/or the like.

Figure 3:
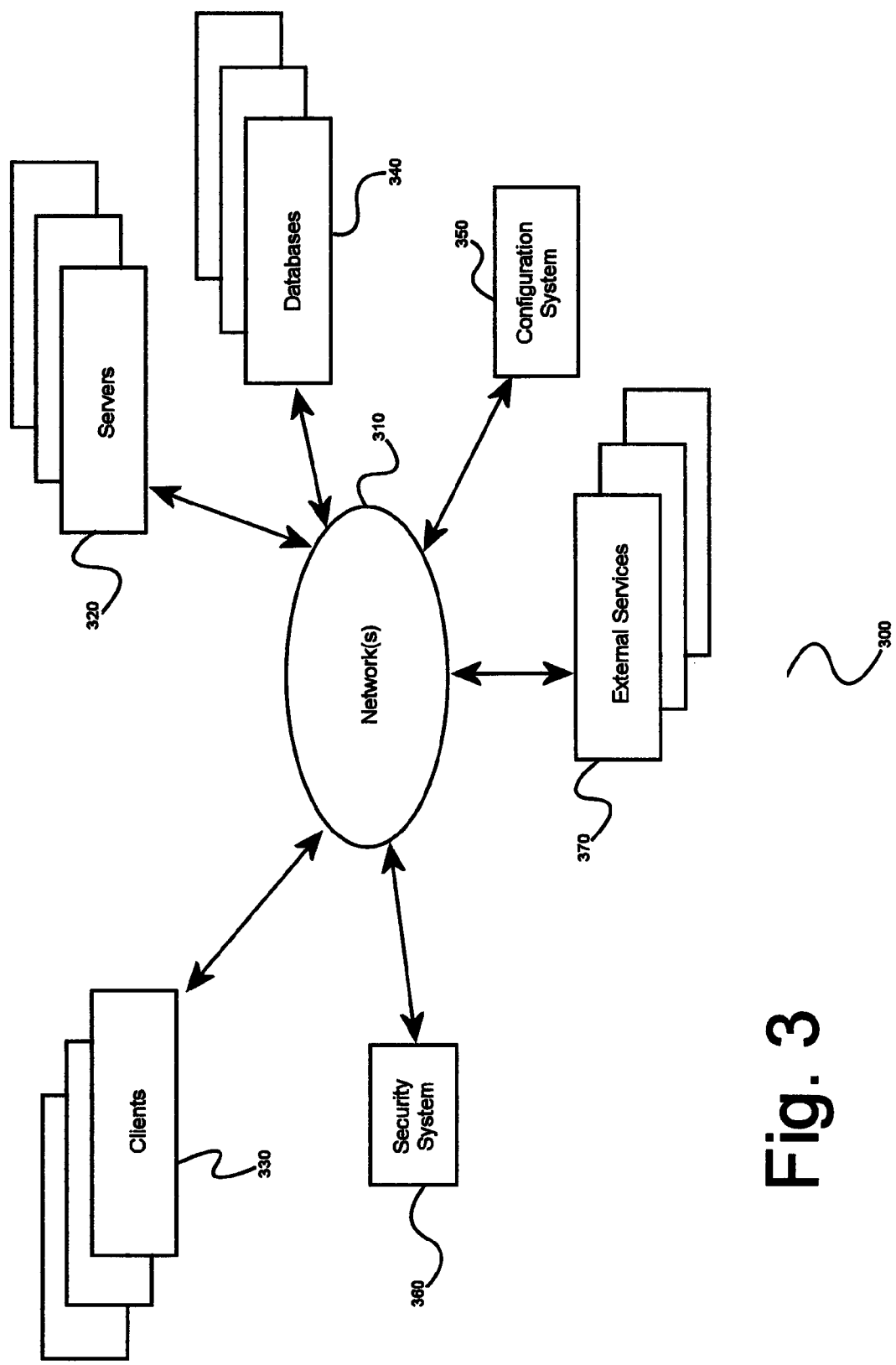
FIG. 3 is a block diagram showing an exemplary architectural arrangement of clients, servers, and external services, according to an embodiment of the invention.

In some embodiments, systems of the present invention may be implemented on a distributed computing network, such as one having any number of clients and/or servers. Referring now to FIG. 3, there is shown a block diagram depicting an exemplary architecture 300 for implementing at least a portion of a system according to an embodiment of the invention on a distributed computing network. According to the embodiment, any number of clients 330 may be provided. Each client 330 may run software for implementing client-side portions of the present invention; clients may comprise a system 200 such as that illustrated in FIG. 2. In addition, any number of servers 320 may be provided for handling requests received from one or more clients 330. Clients 330 and servers 320 may communicate with one another via one or more electronic networks 310, which may be in various embodiments any of the Internet, a wide area network, a mobile telephony network (such as CDMA or GSM cellular networks), a wireless network (such as WiFi, Wimax, LTE, and so forth), or a local area network (or indeed any network topology known in the art; the invention does not prefer any one network topology over any other). Networks 310 may be implemented using any known network protocols, including for example wired and/or wireless protocols.

In addition, in some embodiments, servers 320 may call external services 370 when needed to obtain additional information, or to refer to additional data concerning a particular call. Communications with external services 370 may take place, for example, via one or more networks 310. In various embodiments, external services 370 may comprise web-enabled services or functionality related to or installed on the hardware device itself. For example, in an embodiment where client applications 230 are implemented on a smartphone or other electronic device, client applications 230 may obtain information stored in a server system 320 in the cloud or on an external service 370 deployed on one or more of a particular enterprise's or user's premises.

In some embodiments of the invention, clients 330 or servers 320 (or both) may make use of one or more specialized services or appliances that may be deployed locally or remotely across one or more networks 310. For example, one or more databases 340 may be used or referred to by one or more embodiments of the invention. It should be understood by one having ordinary skill in the art that databases 340 may be arranged in a wide variety of architectures and using a wide variety of data access and manipulation means. For example, in various embodiments one or more databases 340 may comprise a relational database system using a structured query language (SQL), while others may comprise an alternative data storage technology such as those referred to in the art as "NoSQL" (for example, Hadoop Cassandra, Google BigTable, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 360 and configuration systems 350. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 360 or configuration system 350 or approach is specifically required by the description of any specific embodiment.

Figure 4:
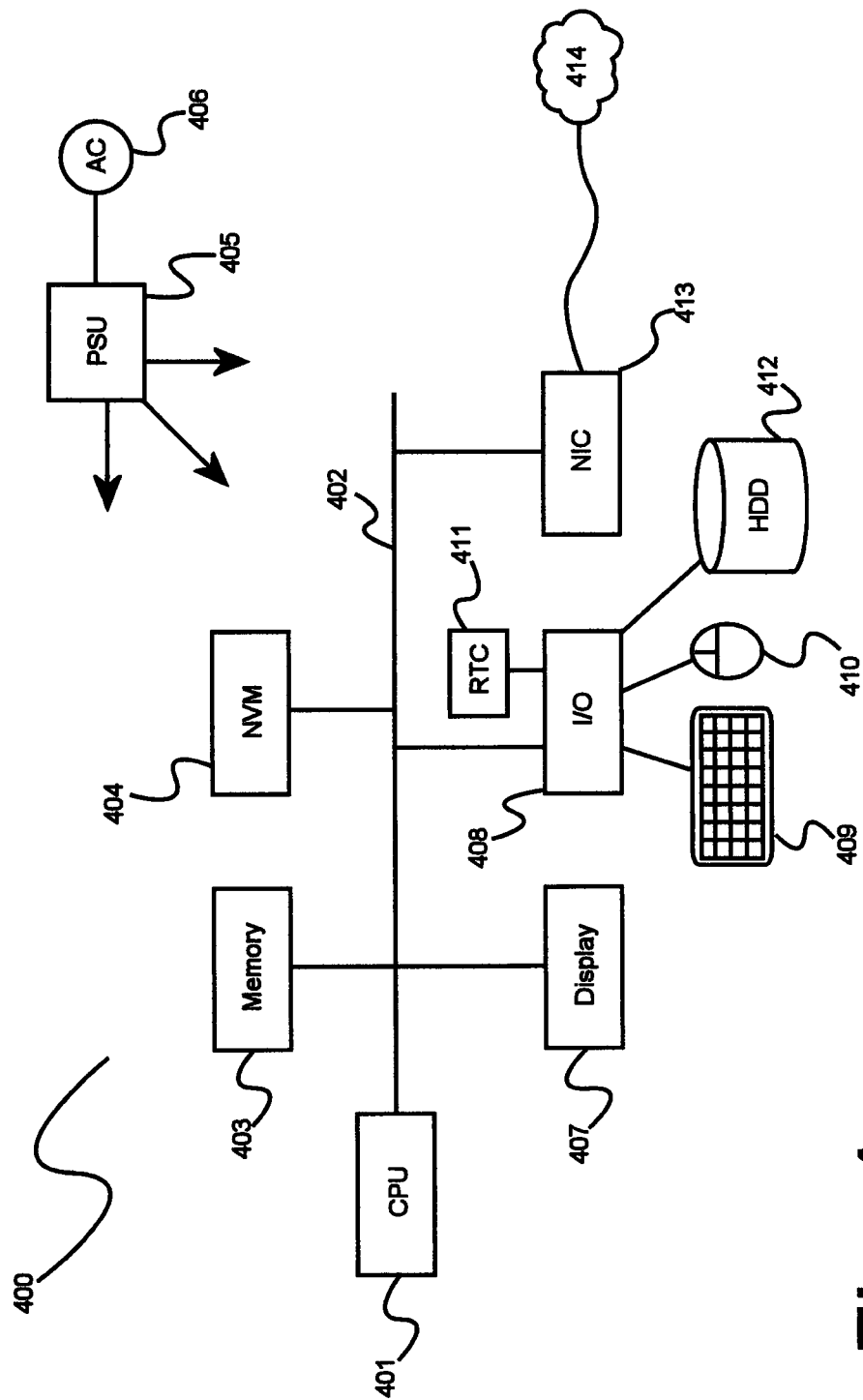
FIG. 4 is another block diagram illustrating an exemplary hardware architecture of a computing device used in various embodiments of the invention.

FIG. 4 shows an exemplary overview of a computer system 400 as may be used in any of the various locations throughout the system. It is exemplary of any computer that may execute code to process data. Various modifications and changes may be made to computer system 400 without departing from the broader scope of the system and method disclosed herein. CPU 401 is connected to bus 402, to which bus is also connected memory 403, nonvolatile memory 404, display 407, I/O unit 408, and network interface card (NIC) 413. I/O unit 408 may, typically, be connected to keyboard 409, pointing device 410, hard disk 412, and real-time clock 411. NIC 413 connects to network 414, which may be the Internet or a local network, which local network may or may not have connections to the Internet. Also shown as part of system 400 is power supply unit 405 connected, in this example, to ac supply 406. Not shown are batteries that could be present, and many other devices and modifications that are well known but are not applicable to the specific novel functions of the current system and method disclosed herein. It should be appreciated that some or all components illustrated may be combined, such as in various integrated applications (for example, Qualcomm or Samsung SOC-based devices), or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

Conceptual Architecture

Figure 5:
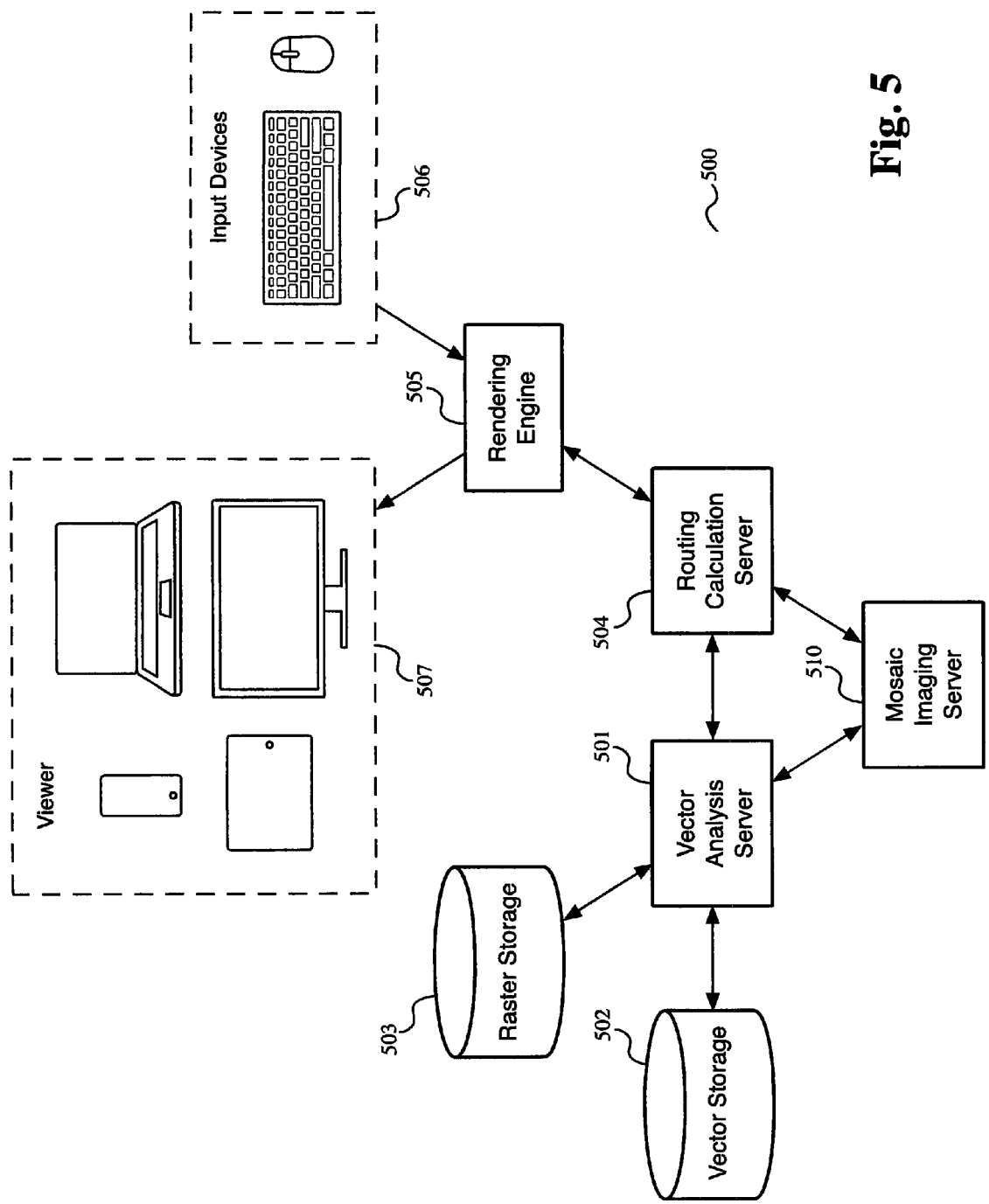
FIG. 5 is a block diagram of an exemplary system architecture for advanced vector editing, according to a preferred embodiment of the invention.

FIG. 5 is a block diagram of an exemplary system architecture 500 for advanced vector editing, according to a preferred embodiment of the invention. According to the embodiment, a vector analysis server 501 may be stored and operating on a network-connected computing device, and may be utilized to perform analysis operations on received vectors such as (for example) retrieving and analyzing vectors from a vector storage 502 such as a database or other data storage means (such as, for example, integral or removable hardware-based storage such as a hard disk drive, or software-based storage schema common in the art). Additionally, an analysis server 501 may analyze raster images such as by retrieving from a raster storage 503, for example such as map images or similar raster-based image data. These analyzed vectors and rasters may then be provided to a routing calculation server 504, that may then identify or associate a plurality of vector points or paths with a raster image, for example identifying a vector-based path and correlating it with a raster-based satellite image of a physical space, forming a combined "route" representing a vector path through the physical space.

Calculated routes may then be provided to a rendering engine 505, that may analyze the routes and form visualizations of the combined vector and raster data such as may be presentable on a viewer 507 such as a display screen, for example for review by a human user. Additionally, a user may interact with the visualization presented using a variety of input devices 506 such as (for example) a computer mouse or keyboard, such as to manipulate the visualization or modify the information being presented. User input may be received by the rendering engine 505 and utilized to update the rendering appropriately (such as to zoom in or out, for example), or may be further provided by the rendering engine 505 to a routing calculation server 504 as needed, for example to recalculate a route based on user modification (such as according to any of the methods described below, referring to FIGS. 6-7). As needed, modified routes may be further provided to a vector analysis server 501, for example to analyze new vector points based on user input, or for storage for future reference.

Additionally, a mosaic imaging server 510 may be utilized to receive and process images or image tiles (that may portions or edited versions of images, for example cropping a single large image into multiple smaller image tiles for ease of use), and may provide these image tiles and mosaics to the vector analysis server 501 and routing calculation server 504 for use in vector operations. For example, as described below (referring to FIG. 11), a plurality of images may be processed by the mosaic imaging server 510 for use as raster image components to be presented optionally with vector information, such as for display and interaction via a viewer 507. The mosaic imaging server 510 may perform such processing operations as to determine bias or offset values for image tiles, to align and match such tiles to form image mosaics (that is, a single composite image from multiple smaller images or tiles), as well as to provide image-based information for use in vector editing, calculation, or routing operations according to the embodiment of the invention.

It should be appreciated that according to the embodiment, various means of connection or communication between the components of a system 500 may be utilized according to the invention interchangeably or simultaneously, such as for example a direct, physical data connection (such as via a data cable or similar physical means), a software-based connection such as via an application programming interface (API) or other software communication means (such as may be suitable, for example, in arrangements where multiple system components may operate on a single hardware device such as a computing server or workstation), or any of a variety of network connections such as via the Internet or other data communications network. It should therefore be appreciated that the connections shown are exemplary in nature and represent only a selection of possible arrangements, and that alternate or additional connections may be utilized according to the invention.

Figure 6:
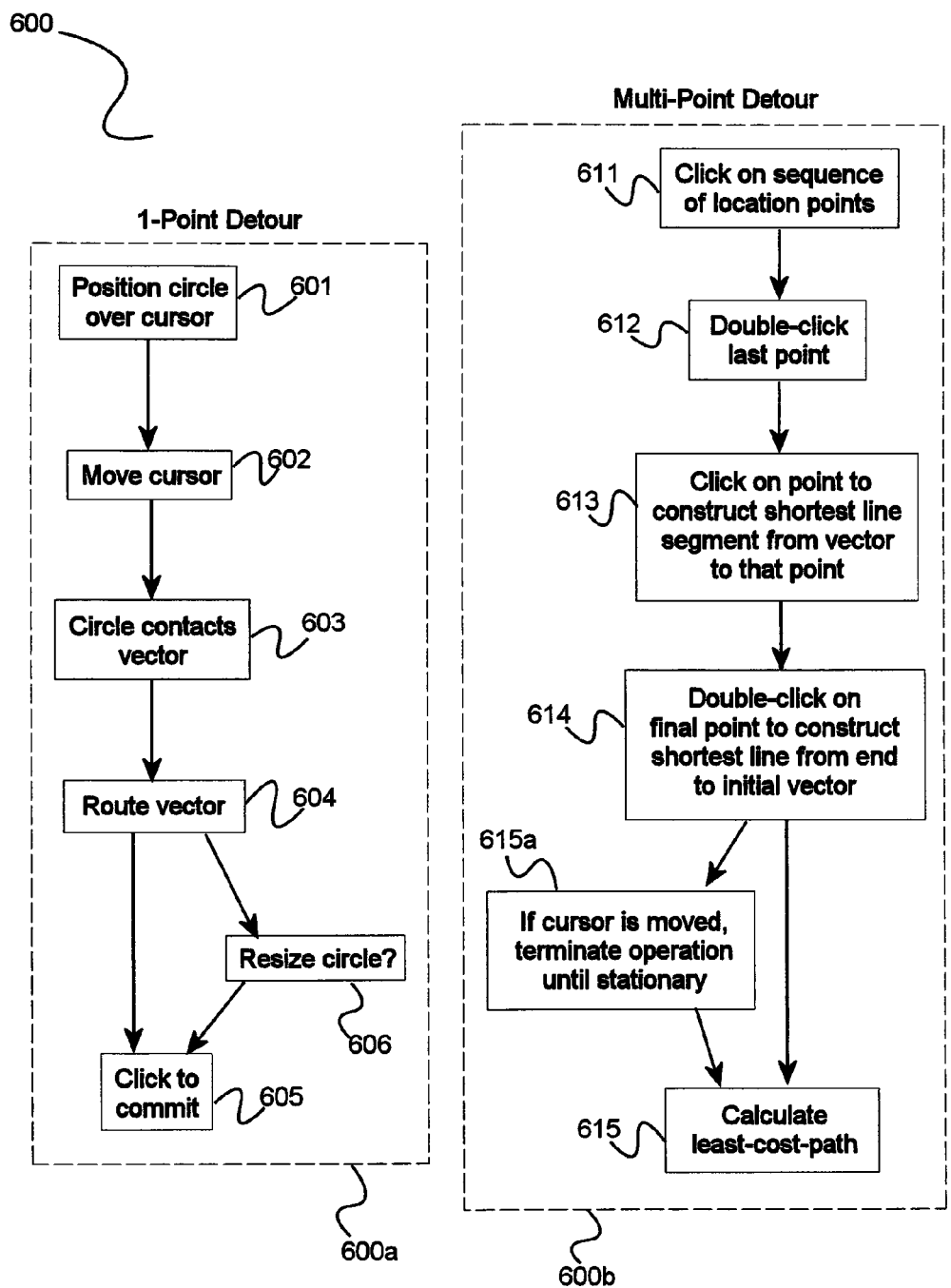
FIG. 6 is a method flow diagram illustrating an exemplary set of methods for two-dimensional image-based vector routing, according to a preferred embodiment of the invention.
Figure 7:
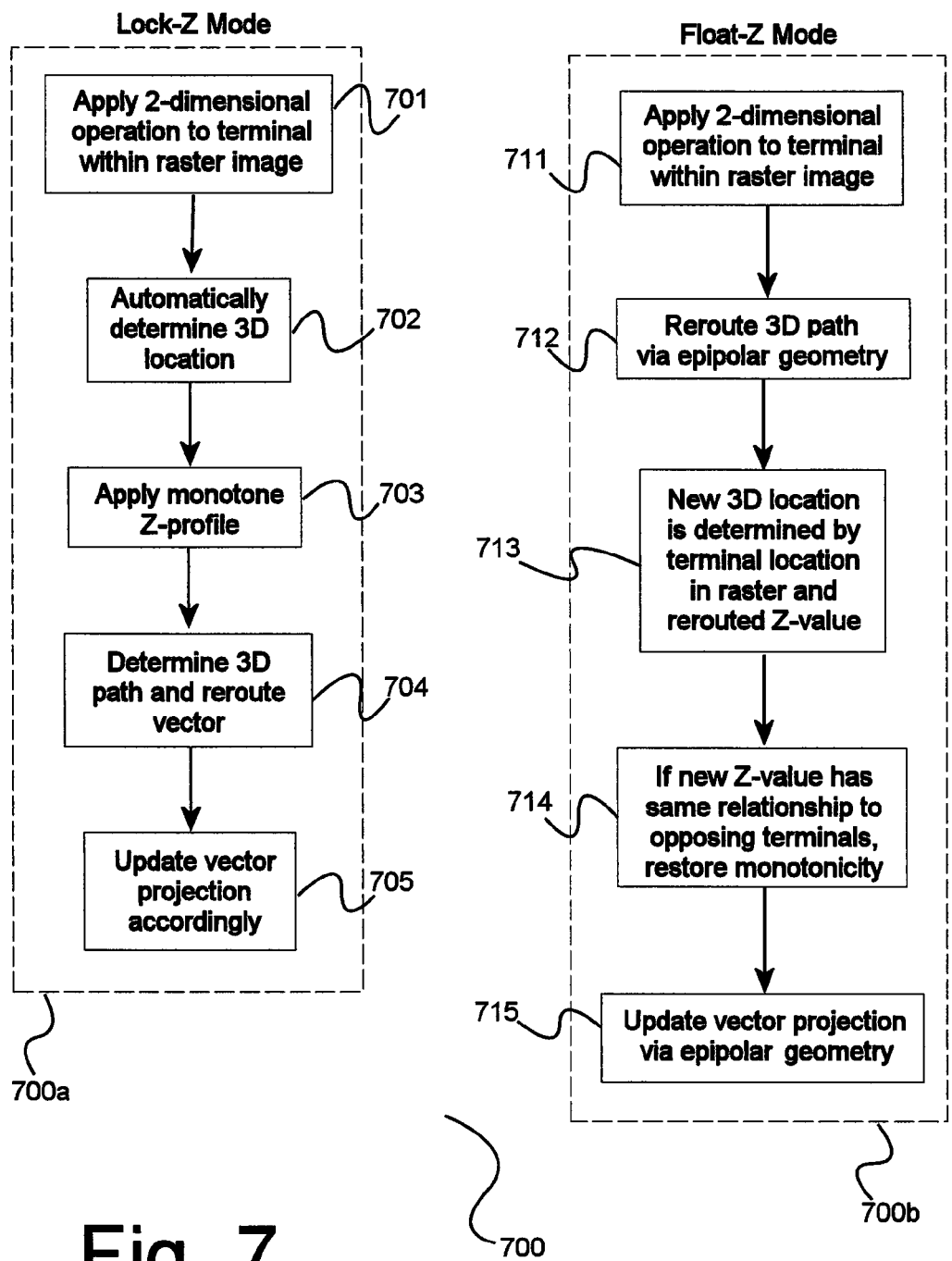
FIG. 7 is a method flow diagram illustrating an exemplary set of methods for three-dimensional image-based vector routing, according to a preferred embodiment of the invention.
Figure 8:
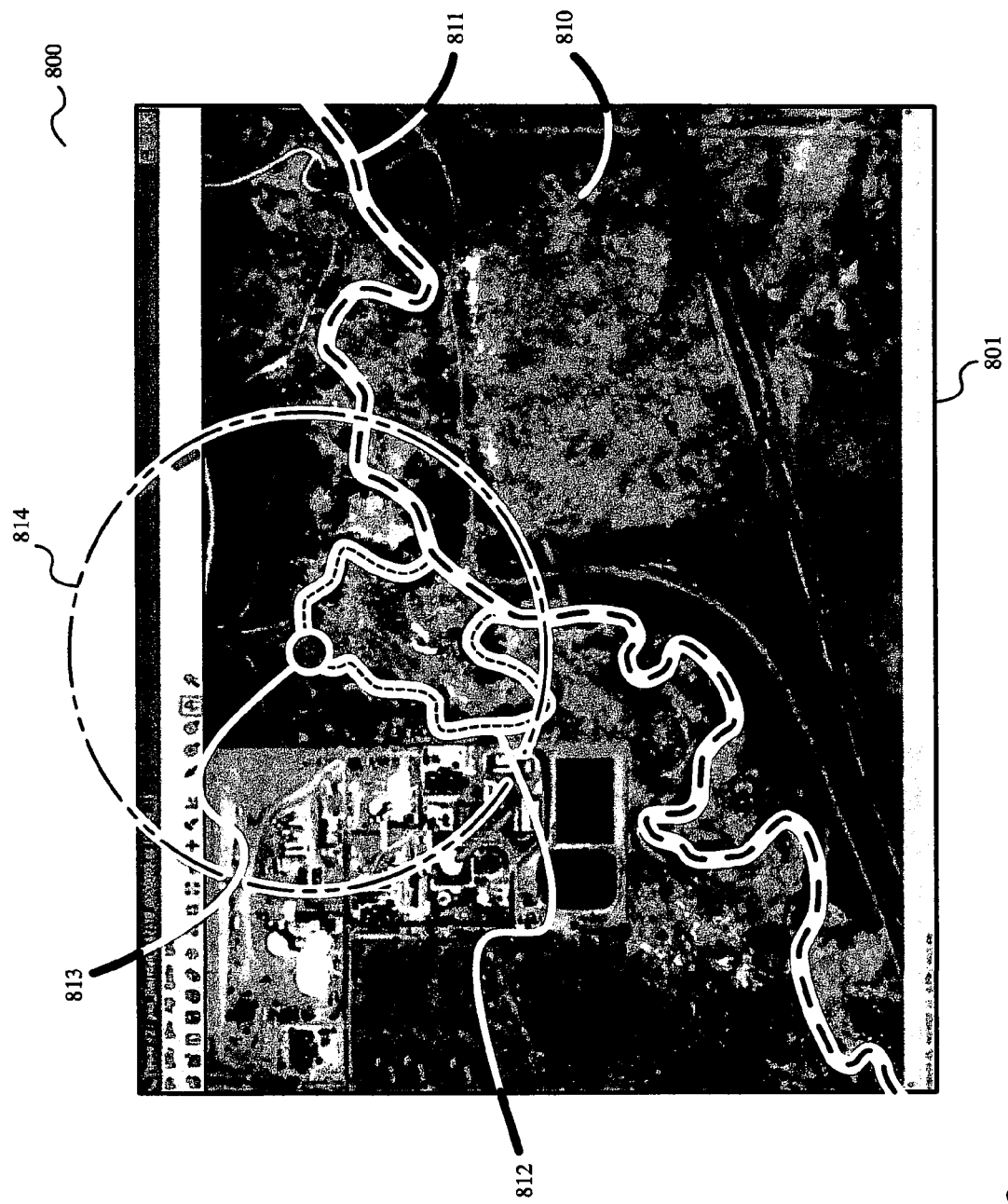
FIG. 8 is an illustration of an exemplary vector routing user interface, illustrating the use of manual routing correction in a projection of a vector onto a raster image.

FIG. 6 is a method flow diagram illustrating an exemplary set of methods 600 forsemi-automated vector editing (re-routing) of seamlines in an ortho-mosaic, according to a preferred embodiment of the invention. As illustrated, a variety of routing modes may be utilized, and means of manipulating a vector according to each mode are described. Reference may be made to the use of mouse clicks as a means of user input, however it should be appreciated that this is exemplary and a variety of additional or alternate input means may be utilized according to the invention, and the use of a computer mouse is described for clarity.

Figure 9:
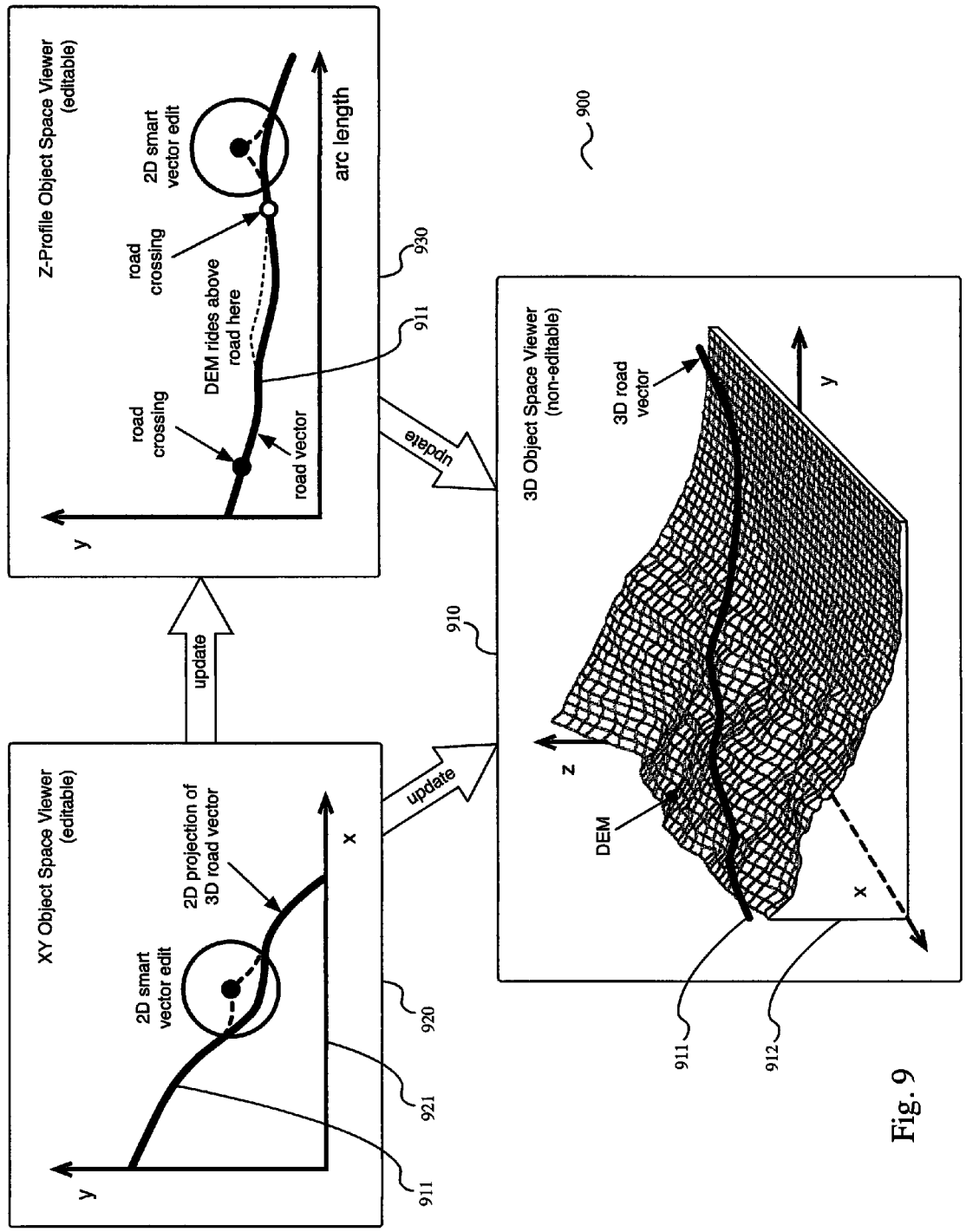
FIG. 9 is an illustration of an exemplary vector routing user interface, illustrating the use of vector routing in a three-dimensional vector projection.

Single-Point Detour Mode 600a:

In this mode, a circle may appear in a display (for example, such as a graphical vector routing display described below with reference to FIG. 9) centered at the instantaneous location of the mouse cursor in an initial step 601. This circle may delimit a region of influence around an interaction cursor. In a next step 602, the cursor may move or be moved, along with the circle moving with it. In a next step 603, the circle may come in contact with an initial vector V, and in a next step 604 the vector may be rerouted in real-time (or near real-time) through the cursor location and within the confines of the circle. This allows for a visual preview of the reroute prior to committing to it. In a next step 605, interacting with the interface (such as pressing a key on a keyboard or clicking a computer mouse, or any other suitable means of user input) on the current cursor location accomplishes the actual commit. The committed rerouted vector remains in the display. In an optional side step 606, user input may be received to manipulate the cursor or the circle, such as (for example) scrolling the wheel on a computer mouse. Upon editing (rerouting) the seamline vector V, whether during preview or commit, the image strips (rasters) in the mosaic clipped by the original seamline vector V are re-clipped in real-time by the rerouted seamline vector V and re-displayed in the viewer.

In one situation, the circle may intersect the initial seamline vector V at two or more points, but does not contain either vector endpoint within its interior. Viewing the vector V as an ordered sequence of vertices, let A denote the first point (not generally a vertex) along the vector that intersects the circle. Let B denote the last point (not generally a vertex) along the vector that intersects the circle. Let P denote the cursor location. Then the portion of V within the circle will be rerouted via a new path consisting of a straight line segments from A to P and from P to B.

In another possible situation, the circle may contain exactly one endpoint of the initial seamline vector V. Call it A. Let B denote the point of farthest arc length along the vector from A that intersects the circle. The points A and B here now play the same role that the points A and B played in the previous paragraph.

In another situation, the circle may contain both endpoints of the initial seamline vector V. Call them A and B. The points A and B here now play the same role that the points A and B played above, in that A denotes the first point (not generally a vertex) along the vector that intersects the circle and B denotes the last point (not generally a vertex) along the vector that intersects the circle.

Multi Point Detour Mode 600b:

In this mode, in an initial step, the user may place a mouse-click at location $P_1$ in the vicinity of a seamline vector V in the viewer. In subsequent steps, the user may place additional mouse clicks at locations $P_2, P_3, \ldots, P_{k-1}$ in the viewer, and in a final step, the user indicates the last location in the sequence, $P_k$, with a double mouse click, again in the vicinity of V. In an initial step, upon clicking at location $P_1$, the shortest line segment from V to $P_1$ may be constructed and displayed in the viewer. In a final step, upon double-clicking at location $P_k$, the shortest line segment from $P_k$ to V may be constructed and displayed in the viewer. In a middle step, after clicking at location $P_{j+1}$, a straight line segment from $P_j$ to $P_{j+1}$ may be displayed in the viewer. Even while the mouse-cursor location $P_{j+1}$ is in motion, the straight line segment from $P_j$ to $P_{j+1}$ may be displayed in the viewer. When the double-click finally occurs at location $P_k$, the polygonal path through $P_1, P_2, P_3, \ldots, P_k$ replaces the corresponding section of the original seamline vector V and the result remains displayed in the viewer. Additionally, the image strips (rasters) in the mosaic clipped by the original seamline vector V are re-clipped in real-time by the rerouted seamline vector V and re-displayed in the viewer.

It should be appreciated that other devices besides a computer mouse may be utilized according to the invention. It should be appreciated that a different local rerouting of the seamline vector V within the circle is possible other than what has been described previously. Also, the region of influence displayed need not be a circle, but could be some other shape. All this as may be suited to the nature of the invention disclosed herein.

Figure 10:
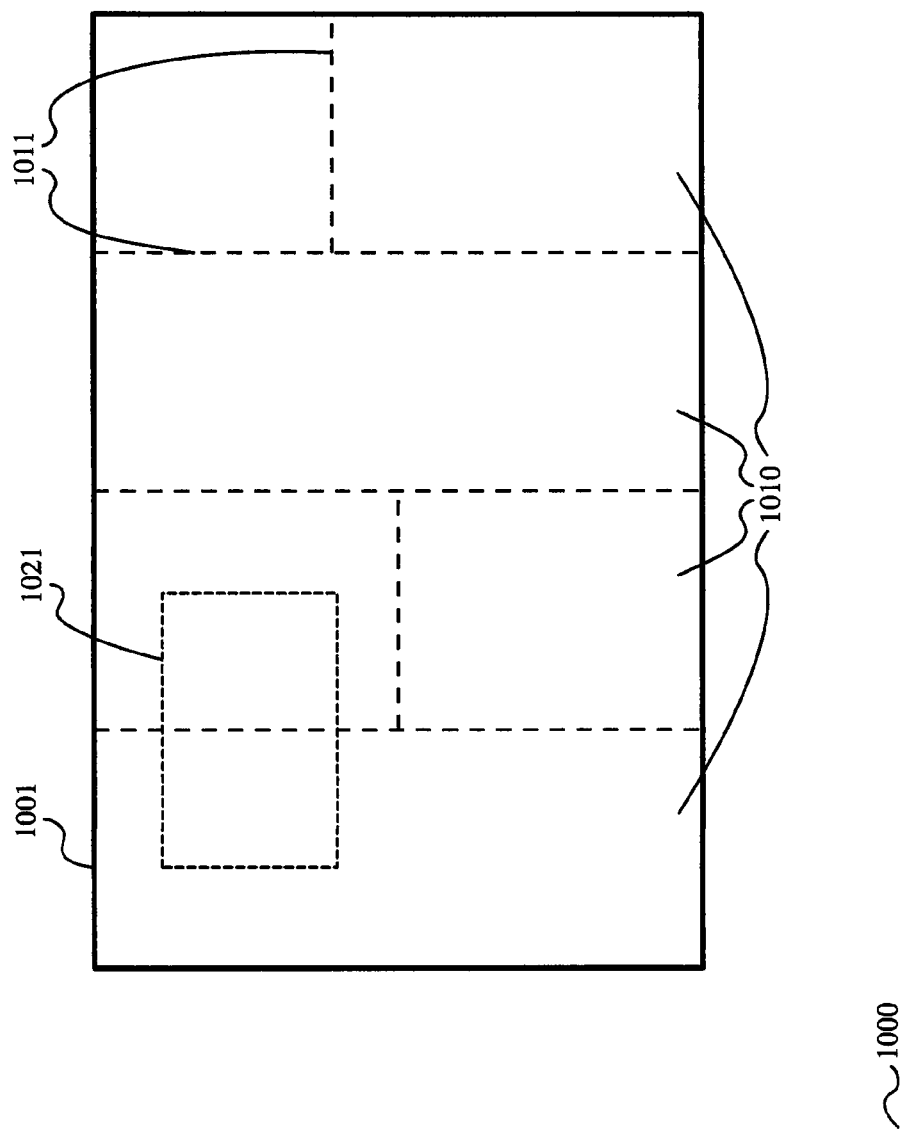
FIG. 10 is an illustration of an exemplary graphical interface for viewing and editing seamline vectors in an ortho-mosaic.

FIG. 10 is an illustration of a graphical interface 1000 that may be coupled with backend capabilities such as those provided by a matching system (described above, referring to FIG. 5) adapted to support local uniform tonal adjustment across a seamline 1011 in an ortho-mosaic 1001 built from remotely-sensed imagery. Through the viewer 1000, a user may examine the mosaic 1001 in total, or any part of it through pan and zoom.

Variation 1:

The user draws a polygon 1021 in the mosaic 1001 that straddles a seamline 1011. Let A and B denote the two mosaic tiles 1010 incident to the seamline. The user invokes a dialogue box that displays the A band histograms and the B band histograms, both constrained to the user-defined polygon. The histograms are displayed in such a way that each A band histogram can be easily compared with the corresponding B band histogram. The user can adjust the gain or bias of any band histogram independently of the others, and see in real-time the effect on both the histogram itself and on the associated mosaic tile in the viewer. The change to the latter is constrained to the user-defined polygon.

Variation 2:

The user draws a polygon in the mosaic that straddles a seamline. Let A and B denote the two mosaic tiles incident to the seamline. The user invokes automation to construct the A band histograms and the B band histograms, both constrained to the user-defined polygon. The automation performs histogram matching of corresponding band histograms (i.e., causes corresponding band histograms to assume similar center and dispersion) by automatically adjusting their gain/bias. For example, an A band histogram and its corresponding B band histogram might both have their gain/bias adjusted to match a histogram "midway" between the two of them. The histogram matching is reflected in the viewer, which shows the effect on mosaic tiles A and B within the user-defined polygon.

In an embodiment of the invention, a graphical user interface and backend capability to support creation of a continuous local tonal adjustment function to a tile of an ortho-mosaic, is disclosed. A continuous local tonal adjustment function $f(x, y)$ is a continuous function that prescribes gain/bias (per band) for each pixel (x, y) in the tile. The function $f(x, y)$ will be explicitly defined near the boundary of the tile to yield a good local tonal matching with neighboring tiles while interpolating gain/bias through the interior of the tile.

Figure 11:
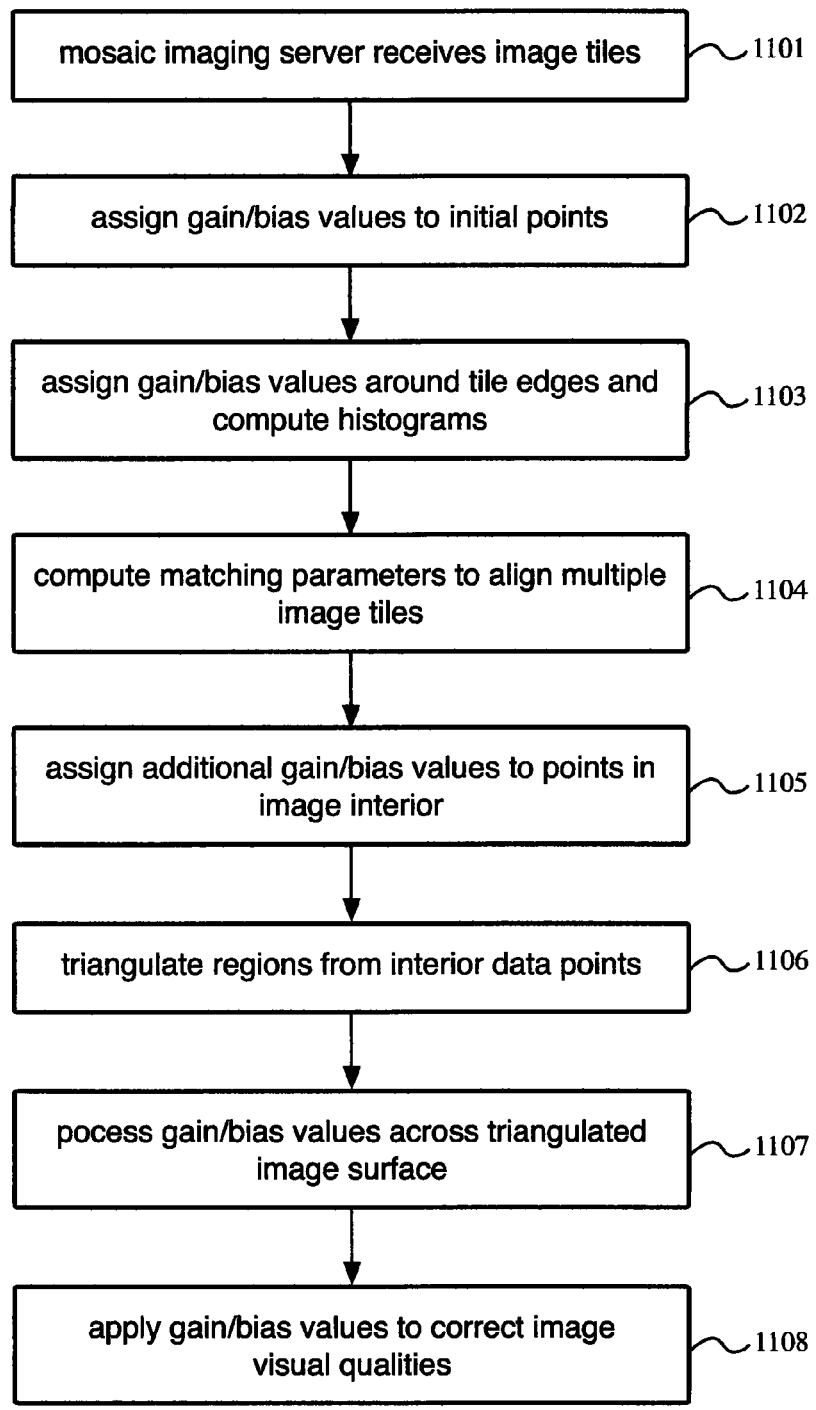
FIG. 11 is a method flow diagram illustrating an exemplary method for vector matching, according to a preferred embodiment of the invention.

FIG. 11 is a method flow diagram, illustrating an exemplary overview method 1100 to locally adjust gain/bias of a tile in a mosaic to match it with its neighbors while interpolating gain/bias through the interior. According to the embodiment, in an initial step 1101 a plurality of images may be received by a mosaic imaging server, each image being optionally a portion or altered version (such as cropped or resized) of another image interchangeably, for example taking a single large image and cropping into smaller portions and then providing those portions to the mosaic matching server. In a next step 1102, a mosaic imaging server may assign gain and bias values to initial points in an image tile, for example (as in an automated use case described below), the corners of the initial image tile. In a next step 1103, the mosaic imaging server may assign additional point values around the boundary or edge of an image tile, along with corresponding histograms representing the image pixels in a radius around the points. In a next step 1104 these histograms may be used along with bias and gain information to determine suitable matching parameters for multiple image tiles. For example, by adjusting the alignment of image tiles such as to minimize discrepancies in their histograms, it can be inferred that the alignment is a good pixel match (that is, the pixels will line up properly and the images will be aligned such as to form a complete, larger image rather than having an offset that may distort or compromise the image quality).

In a next step 1105, the mosaic imaging server may then generate additional control points within an image tile (for example by overlaying a grid of points), and these points may then be used to form triangulated regions in a next step 1106. In a next step 1107 these triangulated regions may then be processed to produce a "surface" of gain or bias values over the entire image tile (for example, calculated from the gain or bias values for bounding points of triangulated regions). In a final step 1108, the calculated gain or bias values may be applied to the pixels within the image tile, adjusting its tonality or other image visual characteristics (such as contrast or brightness) to enhance mosaic generation and matching, and to improve the utility of raster-based imagery used in vector operations. In this manner, it may be appreciated that a mosaic imaging server may "stitch" together multiple image tiles to form larger images while also correcting for inconsistencies in the appearance of the tiles so that the mosaic formed is not distorted, and these mosaics may then be provided for use as raster-based imagery for vector operations.

Automation considers each corner point of image A as a control point. Automation assigns gain 1, bias 0 to each band (RGB) at each of these control points. Automation triangulates image A on its 4 control points.

The user can add a control point to the tile by clicking the mouse at the desired location. This causes the triangulation in that tile's bounding box to be updated to incorporate the new control point.

Variation 1:

The gain/bias of the new control point is set manually through an interface.

Variation 2:

Automation constructs a local patch in the mosaic centered at the control point. This variation applies when the patch contains pixels both from Image A (Image A contains tile A, which we are adjusting) and from Image B (which contains a tile that neighbors A). Automation constructs two local histograms, one for image A's pixels in the patch, and one for image B's pixels in the patch. Automation determines how to match A's local histogram with B's local histogram by adjusting A's gain and bias. This is the gain and bias assigned to the control point.

At any subsequent time, each image is triangulated, but the triangulation will generally include additional control points that are interior to the image.

A problem we consider here is the construction of large-area (typically on the order of $10^7$ km$^2$) mosaics from high-resolution satellite imagery (on the order of a meter or less per pixel). The input imagery is typically ortho-rectified strips taken from a high-resolution imaging satellite like WORLDVIEW-2™ or GEOEYE-1™. The goal is to adjust the color of these strips such that when they are stitched together into a mosaic, their color and intensity is as close as possible. The input strips, so modified, form good input into the larger process that produces a seamless large-area mosaic.

Part of the approach to tonal matching of the image strips is to match them to a base layer of low resolution USGS LANDSAT-8™ imagery. However, attempting to do this with one global tonal adjustment per-strip does not typically lead to a visually satisfying result. (For instance, if a strip contains a small region (like a town) that is significantly brighter than the surround area, it may end up washed out by the global adjustment, as it is a statistically insignificant area of the strip. The algorithm can also lead to large differences in color between neighboring strips due to the wide extent over which a strip is matched to the base layer).

Better results are achieved by adjusting the tone locally throughout the strip, but in continuous fashion. This allows the adjustment in one part of the strip to be different from that in another part of the strip, while at the same time, the tonal adjustment at one pixel is very similar to that for a neighboring pixel. A subtlety, even for local tonal adjustment, is how to address those portions of an image strip where a content discrepancy exists in comparison to the base layer. For example, the image strip may show a cloud where the base layer has none. Other content discrepancy might involve vegetation (presence/non-presence), vegetation (seasonal color), snow, water, city development, etc. Attempting to match the image strip to the base layer in such areas of discrepancy does not lead to good results.

According to another preferred embodiment of the invention, a process to compute local tonal adjustment to image strips that matches to the base layer where there is little or no content discrepancy, and appropriately adjusts the local tone of the image where there is content discrepancy, is disclosed. The tonal adjustment is continuous throughout each image strip and across neighboring image strips.

For each band, do the following. Normalize the local target image histogram (from the image to be used in the mosaic) and the local reference image histogram (from the base layer image), putting both on a DN scale from 0 to 1. Next transform the histograms by taking the logarithm of the normalized DN values. Then match the target histogram to the reference histogram in the logarithm domain (i.e., find the gain and bias parameters in the logarithm domain that achieves the match.) Then apply the exponential to the DN values of the matched target histogram in the logarithm domain, to realize the adjusted version of the original target histogram. The whole adjustment is governed by a handful of parameters computed along the way, most notably, the gain and bias that were computed in the logarithm domain to achieve the match there. These parameters can be stored in a lookup table (LUT) for the image patch—they dictate how the patch would be transformed to match the base layer. The transformation could be applied to each pixel of the patch individually.

Input:
High resolution seasonally-selected images to form the mosaic
Low resolution base layer of seasonally-selected LandSat imagery that has been corrected for haze (standard ways to do this.) As needed, the base layer may be up-sampled to the resolution of the high-resolution imagery being used to construct the mosaic.

Fully Automated Process:
1) Take the image strip that we want to match to the base layer and divide it into small tiles.
2) Construct various masks for the image strip to indicate where tonal matching to the base layer should not be performed. These masks are geared to the items below. We can form a "union" mask by taking the union of all these masks.
   a. Cloud discrepancy
   b. Snow discrepancy
   c. Water (water should not be matched even when present in both images)
   d. Vegetation discrepancy (presence/non-presence)
   e. Vegetation discrepancy (e.g., red in one image, green in the other)
   f. Etcetera
3) An alternative to (2): Instead of the binary (good/bad) union mask above, introduce a "score" raster where the DN values of the score raster can be any integer between, say, 0 and 255. A score raster indicates the degree to which each pixel in the image (or a local patch around it) is good for base layer match.
4) Mark each tile of the image strip that has significant overlap with the union mask. (Alternatively, mark each tile that has low mean or median score of its pixels.)
5) (Adaptive subdivision to find smaller tiles that are good for base layer matching.) Subdivide each marked tile into smaller tiles. Mark each sub-tile if it has significant overlap with the union mask (or has low mean or median score of its pixels.) Repeat this step as desired before going to the next step.
6) Match each unmarked tile of the strip to the base layer and get its LUT values. Associate these LUT values with the center point of the tile.
7) With respect to marked tiles, the following are options:
   a. Do nothing
   b. Assign to the center of a marked tile the LUT value that says "maintain the current tone"
   c. Assign to the center of a marked tile an LUT value that would yield good visual results knowing which mask was predominant in the tile. For example, if the tile had significant overlap with cloud or snow, the LUT value could be chosen so that the tile center is mapped to satisfactory tone for cloud.
   d. Let's not constrain ourselves to the centers of marked tiles. We could look at connected components of marked tiles and place LUT values at one or more locations anywhere within the connected component.
8) Triangulate the image on the centers of all unmarked tiles, and on any additional LUT points added in the previous step. Do something like a Delauney triangulation which constructs triangles that do not have arbitrarily small aspect ratio (small dimension to large dimension)
9) Use the triangulation to interpolate the LUT values to the entirety of the image. Within each triangle do linear interpolation of the LUT values at its three corners. We have now defined the LUT value for every pixel in the image.

In another preferred embodiment of the invention, a graphical user interface and backend capability to support: (a) excising a patch from the current mosaic and replacing it with a patch from an alternate image (raster); (b) tonally adjusting the replacement patch; (c) tonally feathering the replacement patch to appear as seamless as possible with the rest of the mosaic, is disclosed.

The inputs to this embodiment are the current mosaic, the image strips that contribute the mosaic tiles to the current mosaic, and additional image strips that overlap various portions of the mosaic. In the embodiment, all three data layers are loaded into an interactive graphical viewer, while the user can direct the viewer to display any of these layers as the top layer.

Circular Patch Tool:

In this arrangement, the user brings the mosaic to the top layer of the viewer, then activates a circle centered at the mouse cursor and positions the circle over a local adverse region, say a cloud, within the mosaic. The user can make the circle larger or smaller by scrolling the mouse wheel so that the circle fully contains the cloud. Within the circle, the user is enabled to page through and preview all the hidden image strips loaded into the viewer that overlap the circle. In this sense, the circle behaves like a "soda straw" that provides local visibility to any image strip that crosses it. If the user moves the circle center or changes its radius, the local portion of image strip inside the circle is re-displayed in real-time. For animage strip currently being viewed within the circle (say an image strip that does not exhibit a cloud within the circle), the user can designate that this circular patch be incorporated into the mosaic as a new mosaic region, thereby removing the cloud. Tonal adjustment and feathering of this patch (now a new mosaic region) is enabled via other aspects of the invention described in other paragraphs.

Variation:

Everything the same, but instead of circle, the user can invoke and adjustable square or rectangle. Alternatively, the user can draw a polygon.

According to another preferred embodiment of the invention, a graphical software tool to edit the seam-lines and seam-line junctions of an ortho-mosaic, including editing of the tonal feathering in the vicinity of a seam-line, is disclosed.

Semi-Automated Seam-Line Rerouting with Real-Time Animation Preview:

This arrangement allows the user to reroute an individual seam-line. This capability is derived from the single-point detour and multi-point detour capabilities of the invention. However, the invention adds the following enhancement: real-time clipping of the images on either side of the seam-line.

Semi-Automated Junction Relocation with Real-Time Animation Preview:

This arrangement allows the user to move the junction (terminal) to a new location, while automatically rerouting the incident seam-lines as necessary. It is derived from the Move Terminals capability of the invention. However, the invention adds the following enhancement: real-time clipping of all the images incident to the terminal.

Semi-Automated Image-Based Seamline Rerouting with Real-Time Animation Preview:

This arrangement enables the user to draw a box over part of a seamline and invoke an image-based algorithm to reroute that portion within the box in real-time and displays the results. The box is drag-able and resizable, and enabled with real-time preview display of the reroute. If the user is satisfied with the reroute, the user may persist it.

Semi-Automated Editing of Seam-Line Feathering:

In this arrangement, the invention performs real-time tonal feathering of the seam-lines in a mosaic. (Here's what feathering is: Consider a seamline within the overlap area of raster A and raster B. Let R denote a positive number. At or near the seam-line, the RGB (red, blue, green) of a pixel within the overlap is computed by mixing fifty-fifty the A pixel's color channels with the corresponding B pixel's color channels. When the pixel is a distance d in [−R, R] from the seam-line (negative d means the distance is in the A direction, positive d means the distance is in the B direction) the A:B color interpolation mix is $(R-r)(2R):(R+r)/(2R)$. (Other feathering formulas are possible.) When the distance $d<-R$, the pixel in the overlap takes on the A pixel's color values. When the distance $d>R$, the pixel in the overlap takes on the B pixel's color values.) Once the parameter R is specified by the user, the feathering is well-defined. The user has the ability to perform local feathering at a selected point along the seamline: After the point P is selected along the seamline and a radius R is specified, a feathering formula similar to that above is applied to the pixels inside the disc of radius R centered at P. This feathering formula is designed so as to eliminate the possibility of a color discontinuity at the boundary of the disc, when transitioning from pixels inside the disc to pixels outside the disc.

In another embodiment of the invention, a graphical user interface and backend capability to support global tonal matching of tiles in an ortho-mosaic is disclosed.

The graphical user interface includes a mosaic viewer through which the user can view the mosaic in total, or any part of it through pan and zoom.

The graphical user interface enables the user to selected multiple mosaic tiles at once and effectively merge them into a "super-tile". A "super-tile" has a well-defined histogram (with all the pixels in the super-tile contributing to it.) In what follows, the term mosaic "tile" means either a connected mosaic region belonging to the same image strip (raster) or, just as well, a super-tile.

Variation 1:

The user selects a tile of the mosaic through the GUI. The user invokes a dialogue box displaying the band histograms for the tile. In the dialogue, the user may adjust the gain/bias of each band histogram independently and see the effect in real-time on both the band histogram in the dialogue and the mosaic tile in the viewer.

Variation 2:

This user selects a pair A, B of tiles in the mosaic through the GUI. The user invokes a dialogue box displaying the A band histograms and the B band histograms. The histograms are displayed in such a way that each A band histogram can be easily compared with the corresponding B band histogram. In the dialogue, the user may adjust gain/bias of any A band histogram independently to make it better match the corresponding B band histogram. The effect of the adjustment is seen in real-time on both the A band histogram in the dialogue and the mosaic tile A in the viewer.

Variation 3:

This user selects a pair A, B of tiles in the mosaic through the GUI. Next, the user invokes the following real-time automation. The automation first constructs the A band histograms and the B band histograms. Then it performs histogram matching of the A band histograms to the corresponding B band histograms (i.e., causes the A band histograms to assume similar center and dispersion as the corresponding B band histograms) by automatically adjusting the gain/bias per band of the A band histograms. Lastly, the automation updates mosaic tile A in the viewer.

Variation 4:

The user selects a pair A, B of tiles in the mosaic through the GUI. The user defines two local areas, one in tile A, one in tile B, using a drawing tool to create a polygon (or box, or circle, or ellipse, etc.) within in each of the two tiles. The user invokes a dialogue box displaying the A band histograms for the A local area, and the B band histograms for the B local area. The histograms are displayed in such a way that each A band histogram can be easily compared with the corresponding B band histogram. In the dialogue, the user may adjust gain/bias of any A band histogram independently to make it better match the corresponding B band histogram. The effect is seen in real-time in the A band histogram in the dialogue. Additionally, this gain/bias adjustment is applied to the A band histogram associated with the entirety of tile A (not just the local area within tile A) in the viewer in real-time.

Variation 5:

The user clicks on a pair A, B of tiles in the mosaic through the GUI. The user defines two local areas, one in tile A, one in tile B, using a drawing tool to create a polygon (or box, or circle, or ellipse, etc.) within in each of the two tiles. Next, the user invokes the following real-time automation. The automation first constructs the A band histograms for the A local area and the B band histograms for the B local area. It then performs histogram matching of the A band histograms to the corresponding B band histograms by automatically adjusting the gain/bias per band of the A band histograms. Lastly, the gain/bias adjustments per band are applied to the A band histograms associated with the entirety of tile A, and the result is shown in the viewer.

Variation 6:

This variation is essentially identical to [177] except that the user defines just one local area, call it Q, that straddles the seamline between the tiles A and B. This induces two local areas as before, namely, Q constrained to tile A and Q constrained to tile B.

Variation 7:

This variation is essentially identical to [178] except that the user defines just one local area, call it Q, that straddles the seamline between the tiles A and B. This induces two local areas as before, namely, Q constrained to tile A and Q constrained to tile B.

The skilled person will be aware of a range of possible modifications of the various embodiments described above. Accordingly, the present invention is defined by the claims and their equivalents.

What is claimed is:

1. A system for advanced vector editing, comprising:
   a vector analysis server comprising at least a memory, a processor, and a plurality of programming instructions stored in the memory and operating on the processor thereof;
   a mosaic imaging server comprising at least a memory, a processor, and a plurality of programming instructions stored in the memory and operating on the processor thereof;
   a vector storage database that stores vector and raster data;
   a vector routing calculation server comprising at least a memory, a processor, and a plurality of programming instructions stored in the memory and operating on the processor thereof; and
   a rendering engine comprising at least a memory, a processor, and a plurality of programming instructions stored in the memory and operating on the processor thereof;
   wherein the plurality of programmable instructions of the mosaic imaging server receives images from external image sources and assembles the images to form image mosaics;
   wherein the plurality of programmable instructions of the vector analysis server analyzes a plurality of vector points and provides the results of analysis to the vector routing calculation server;
   wherein the plurality of programmable instructions of the routing calculation server calculates vector routes based at least in part on the received vector analysis information, and provides the vector route information to the rendering engine;
   wherein the rendering engine updates an orthomosaic by re-clipping the orthomosaic based on the calculated vector routes and sends the updated orthomosaic to a user;
   wherein the calculated vector routes are persistently stored in a vector storage database after editing; and
   wherein the plurality of programmable instructions of the rendering engine forms visualizations based at least in part on the vector routing information received.

2. The system of claim 1, further comprising a viewer, wherein the rendering engine provides the visualizations to the viewer.

3. The system of claim 2, wherein the viewer is a visual display screen, wherein the screen displays the visualizations for viewing by a human user.

4. The system of claim 1, further comprising a plurality of user input devices, wherein the user input devices allow a human user to interact with the visualizations.

* * * * *